INVENTOR
RAYMOND BIRD
BY Frederick G. Hang
ATTORNEY

INVENTOR
RAYMOND BIRD
BY Frederick E. Hane
ATTORNEY

Feb. 7, 1961 R. BIRD 2,970,765

DATA TRANSLATING APPARATUS

Filed Oct. 21, 1953 3 Sheets-Sheet 3

INVENTOR
RAYMOND BIRD

BY Frederick E. Hane

ATTORNEY 2,970,765

DATA TRANSLATING APPARATUS

Raymond Bird, Letchworth, England, assignor to International Computers and Tabulators Limited, a British company Filed Oct. 21, 1953, Ser. No. 387,468

Claims priority, application Great Britain Nov. 4, 1952

3 Claims. (Cl. 235—155)

This invention relates to electronic apparatus for data translation.

The majority of devices for recording data by printing or punching operate in the decimal system. On the other hand many electronic computers operate in the binary system. Accordingly, it is necessary to translate the binary values which represent the computer results into the corresponding decimal values in order that they may operate a recorder. This translation may be effected by the computer itself under control of an appropriate programme. However, if the binary values are produced by comparatively few logical operations on the input data then the time spent in translation may well exceed that spent in computing the actual results. The time spent on conversion becomes an even larger factor when the binary values have to be translated into a non-uniform notation such as sterling if the computer is used for accounting problems.

It is an object of the present invention to enable a value expressed in a first system of notation to be translated into a second system of notation by building up a translated value by a series of addition operations from or under control of a limited number of equivalent values which are read successively from a storage device.

It is a further object of the invention to add selectively the stored equivalents under control of the value being translated.

It is another object of the invention to effect the translation by successively subtracting the stored equivalent from the value being translated and performing the addition operation in the second notation only when the result is positive.

According to the invention apparatus for translating a number from a first to a second radix of notation has means for storing a limited number of equivalent values of one of the radices expressed in the other of the radices, means for reading out the stored values sequentially, analysing means for determining which of the equivalent values is contained in said number and means controlled by the analysing means for selecting and summing those read out values which are contained in the said number. The number may be translated into a system employing mixed radices.

In one form, the digits of the number control a gating circuit which selects the required values for summing in an accumulator. Alternatively, the equivalent may be subtracted from the number in turn, to finally reduce it to zero, and those equivalents which produce a positive result on subtraction are summed. In a further form, a negative subtraction result is corrected by adding the differences between successive equivalent values.

The invention will now be described, by way of example, with reference to the accompanying drawings, in which.

Figure 1:
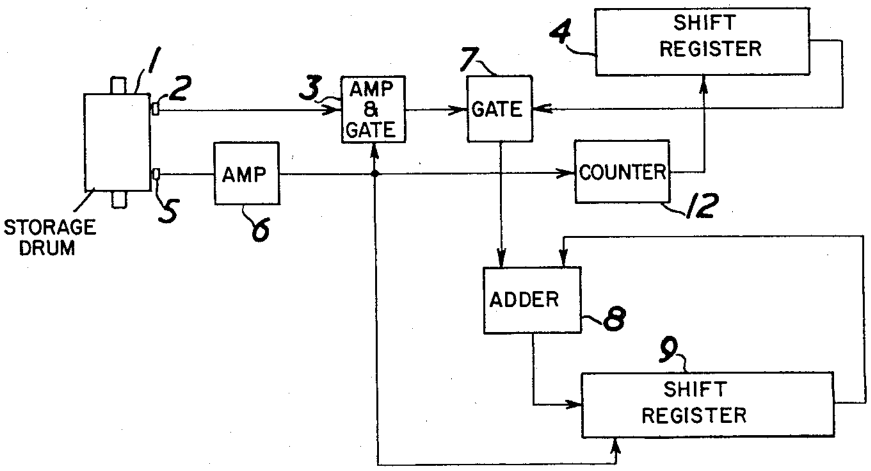
Figure 1 is a block diagram of one form of the invention.

In the first form of the invention the decimal equivalents of each of the binary digits of the largest binary value to be translated are stored on a single track of a magnetic storage drum 1 (Figure 1). Each decimal equivalent is stored in binary coded decimal form, that is each decimal digit is recorded as one or more of the digits 1, 2, 4 and 8 in combination. This coding of the decimal values minimizes the storage space required on the drum and also facilitates the addition of the equivalents.

Each decimal equivalent is recorded as a word of thirty two digit positions. Hence the value of an equivalent cannot exceed $10^8-1$ and the corresponding binary value to be translated must not exceed this total. This allows a maximum of twenty-seven binary digits. The decimal equivalents are recorded around the track in ascending order so that the smallest equivalent value is read first. The first equivalents are below, the non-significant denominations to the left being omitted.

TABLE I

| | | | | | | | | | |
|---|---|---|---|---|---|---|---|---|---|
| $2^0$ | | | | | 0 | 0 | 0 | 1 | (1) |
| $2^1$ | | | | | 0 | 0 | 1 | 0 | (2) |
| $2^2$ | | | | | 0 | 1 | 0 | 0 | (4) |
| $2^3$ | | | | | 1 | 0 | 0 | 0 | (8) |
| $2^4$ | 0 | 0 | 0 | 1, | 0 | 1 | 1 | 0 | (16) |
| $2^5$ | 0 | 0 | 1 | 1, | 0 | 0 | 1 | 0 | (32) |
| $2^6$ | 0 | 1 | 1 | 0, | 0 | 1 | 0 | 0 | (64) |

The equivalent track of the storage drum 1 is sensed by a magnetic head 2 the output of which is fed to an amplifier and gating circuit 3.

A clock track is sensed by a second magnetic head 5 the output of which is fed to a shaping and amplifying circuit 6 to provide a train of clock pulses. These clock pulses are fed to the circuit 3 to gate the output from the head 2 and the resultant signals are fed to a gate circuit 7.

The binary number to be translated is stored in a shifting register 4 consisting of twenty-seven trigger stages, with the least significant digit of the value being stored on the trigger circuit at the right hand end of the register. This trigger stage controls the gate 7 so that when the trigger stage is "on" the gate 7 is open and when the trigger stage is "off" the gate 7 is closed. This corresponds to the registration of a binary one or a binary zero.

The translation process is started when the head 2 begins to read the smallest decimal equivalent. If the least significant digit of the binary value in the register 4 is a one, then the gate 7 will be open and the decimal equivalent corresponding to $2^0$ will be fed through the gate 7 to an adding circuit 8. The output of the adding circuit 8 is connected to the input of a shifting register 9 and the output of the shifting register provides the second input of the adding circuit, thus forming an accumulator. The shifting register 9 is set to zero before the start of the translation operation so that first decimal equivalent passes unchanged through the adder and is stored in the register. The adding circuit 8 has to be of a special type since it is dealing with values in binary coded decimal. Adding circuits of this type are shown and described in British patent specification No. 678,427.

The clock pulses from the circuit 6 are applied to the shifting register 9 to shift it round in synchronism with the digits being read from the storage drum 1. If the least significant binary digit is zero then the gate 7 will be closed and both inputs to the adding circuit 8 will be zero. Consequently, the register 9 will still be shifted but will register zero after the first equivalent has been read out.

The clock pulses are also fed to a six stage binary counter 12 the last stage of which provides shifting pulses for the binary register 4. Thus this register receives one shifting pulse of every thirty-two clock pulses, that is it is shifted once for each equivalent read of the drum.

The second binary digit is now in the extreme right hand position of the register 4 and, therefore controls the state of the gate 7. If this digit is one then the second equivalent will be fed to the adder 8 and will have added to it whatever is stored in the register 9, the sum being fed back into the register.

This selective addition of the decimal equivalents is continued for the remainder of the binary digits so that at the end of twenty-seven cycles all the decimal equivalents have been read from the drum and summed under control of the digits of the binary value being translated. The decimal equivalents, in binary coded form, of the binary value is now stored in the shifting register 9.

Figure 2:
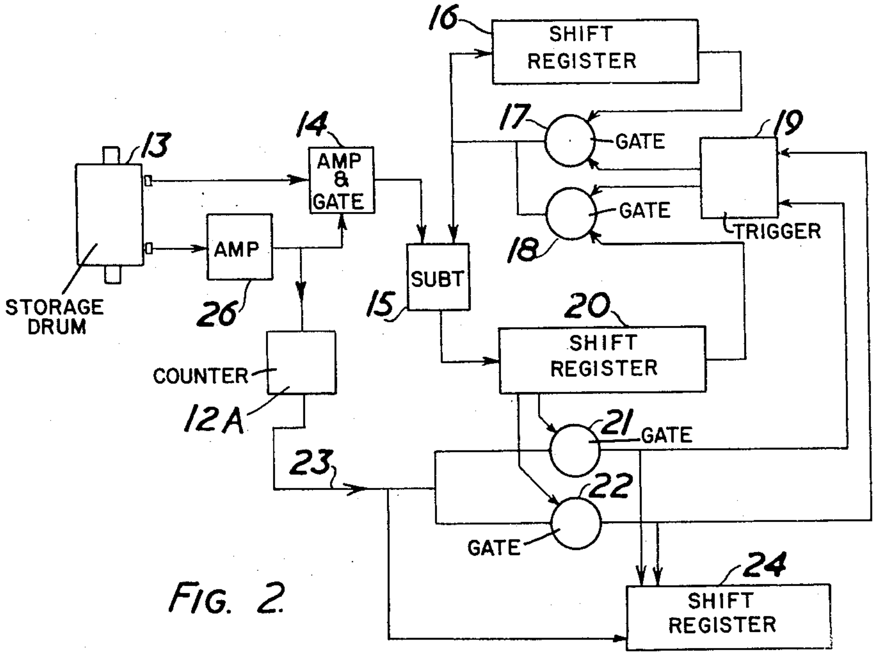
Figure 2 is a block diagram of a modified form of the invention.

The modified form of the invention shown in Figure 2 avoids the necessity for using an adder capable of dealing with binary coded decimal values, but it requires an extra shifting register. In this form, the equivalents recorded on the drum are 1, 2, 4, 8, 10, 20, 40, 80, 100, etc. expressed in binary. The equivalents are recorded on a magnetic drum 13 in reverse order so that the highest equivalent is sensed first. Thus, the first value to be read will be $8\times10^7$, followed by $4\times10^7$, $2\times10^7$, $1\times10^7$, $8\times10^6$ and so on.

The last few equivalents recorded on the drum are shown in Table II.

TABLE II

| | | | | | | | | |
|---|---|---|---|---|---|---|---|---|
| 200 | 1 | 1 | 0 | 0 | 1 | 0 | 0 | 0 |
| 100 | 0 | 1 | 1 | 0 | 0 | 1 | 0 | 0 |
| 80 | 0 | 1 | 0 | 1 | 0 | 0 | 0 | 0 |
| 40 | 0 | 0 | 1 | 0 | 1 | 0 | 0 | 0 |
| 20 | 0 | 0 | 0 | 1 | 0 | 1 | 0 | 0 |
| 10 | 0 | 0 | 0 | 0 | 1 | 0 | 1 | 0 |
| 8 | 0 | 0 | 0 | 0 | 1 | 0 | 0 | 0 |
| 4 | 0 | 0 | 0 | 0 | 0 | 1 | 0 | 0 |
| 2 | 0 | 0 | 0 | 0 | 0 | 0 | 1 | 0 |
| 1 | 0 | 0 | 0 | 0 | 0 | 0 | 0 | 1 |

The principle of operation is that the first equivalent is subtracted from the binary value to be translated and if the resulting difference is positive the binary code decimal value of the equivalent is entered into a register 24 similar to the register 9 of Figure 1. The next equivalent is then subtracted from the difference. If the difference is negative then zero is entered in the register 24 and the next equivalent is subtracted from the original value.

The equivalents and clock pulses read from the drum 13 are amplified and gated by circuits 14 and 26 similar to the circuits 3 and 6 (Figure 1). The output from the circuit 14 is applied to a binary subtracting circuit 15. The other input to the subtracting circuit 15 is provided by the output from a shifting register 16 or a shifting register 20 according to the setting of two gates 17 and 18. These two gates 17 and 18 are controlled by a trigger circuit 19. A suitable circuit for subtracting is shown and described in U.S. application Serial No. 344,713, filed March 26, 1953, now Patent No. 2,904,252.

At the beginning of the conversion operation, the register 16 contains the binary number to be translated and the register 20 is set at zero. The trigger circuit 19 is set to open the gate 17 and close the gate 18 so that the binary value stored in the register 16 is fed to the subtracting circuit 15 and has subtracted from it the highest equivalent. The difference is fed to the register 20.

If the difference is negative the subtracting circuit produces the complement of the true difference; hence, at the end of the subtracting operation the highest significant digit in the register 20 will be zero if the difference is positive and one if the difference is negative.

After the reading of the first equivalent from the drum 13 an end of word pulse is applied by a line 23 to two gates 21 and 22. This end of word pulse is derived from a counter 12A similar to the counter 12 of Figure 1. These two gates are controlled by that trigger stage in the register 20 which registers the most significant digit. If this digit is zero indicating a positive difference, then the gate 21 is open and the gate 22 is closed. If the digit is one, then the gate 22 is open and the gate 21 is closed. The output from the gate 21 sets the trigger circuit 19 so that it opens the gate 18 and closes the gate 17. It also sets the extreme left hand trigger circuit of the register 24 to register one. Consequently, an output from the gate 22 sets the trigger circuit 19 to open the gate 17 and enters zero in the register 24.

The input for the shifting register 16 is provided by the input to the subtracting circuit 15 from the gates 17 and 18. Hence, after the first equivalent has been read from the drum the register 16 contains the original binary number and the register 20 contains the difference. If this difference was positive, then this value will be read through the gate 18 to the subtracting circuit 15 and also into the shifting register 16. Thus, the second equivalent will be subtracted from the difference and the new difference entered into the register 20. On the other hand if the difference was negative then the original binary value will be read to the subtracting circuit through the gate 17 and the difference between this and the second binary equivalent will be stored in register 20.

Since the chosen equivalents are 1, 2, 4, 8 etc. the entry of one or zero into the register 24 by the gates 21 or 22 is the same as entering the binary coded decimal value of the equivalents, the register 24 being shifted once for each equivalent read from the drum. The process is repeated for each of the equivalents recorded on the drum so that at the end of thirty-two cycles the decimal value corresponding to the original binary value has been built up in the register 24. Owing to the shifting of the digits in the register 24 the most significant digit of the translated result will be positioned at the extreme right hand end of the register.

Figure 3:
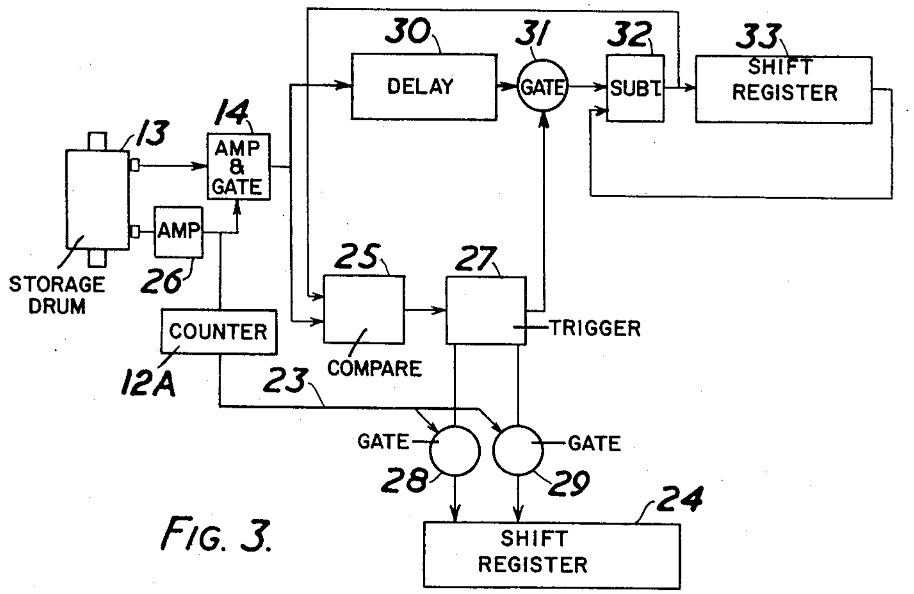
Figure 3 is a block diagram of a modification of the form shown in Figure 2.

Figure 3 is a modification of Figure 2 in which the possible over substraction, and consequent loss of the original value, is obviated by comparing the size of the binary value, and the equivalent term being subtracted, before subtraction is effected and only effecting those subtractions for which the difference will be positive.

The equivalents and clock pulses are read from the drum 13 and amplified and gated by circuits 14 and 26 as in Figure 2. The output from the gate circuit is applied to a one word delay circuit 30 and to a comparing circuit 25. The other input to the comparing circuit 25 comes from a shifting register 33 which stores the binary value via a subtracting circuit 32. The other input to the subtracting circuit comes from the output of the delay circuit 30 via a gate 31.

During the comparison of the first equivalent by the circuit 25, there is no output from the circuit 30, so that the binary value in the register 33 is read out and compared in the circuit 25. If the circuit 25 establishes that the equivalent is the larger amount, a trigger 27 is set to close the gate 31 and to allow an end of word pulse on a line 23 derived from counter 12A to pass through a gate 28 to enter zero in the most significant portion of the equivalent shifting register 24. If the equivalent is smaller than or equal to the binary value then the circuit 25 effects the setting of the trigger 27 to open the gate 31 and to enter a one in the equivalent shifting register 24 via a gate 29.

This entry of values in the equivalents register 24 corresponds with the entry controlled by the gates 21 and 22 as described with reference to Figure 2.

During the second word time when the second equivalent is being transmitted by the gate 14 to the comparing circuit 25, the first equivalent having been delayed by the delay circuit 30 is fed to the gate 31 which is now open if the equivalent was less than or equal to the binary value. The subtracting circuit 32 effects the subtraction of the first equivalent from the value in shifting register 33. The difference is fed back to register 33 and also to the comparing circuit to enable comparison of this difference with the second equivalent. Had the first equivalent been larger than the binary value with which it was compared then the gate 31 would have remained closed during this time and the original value would have, therefore, been reentered in the register 33 and fed to the comparing circuit.

A form of comparing circuit which is suitable for use as the circuit 25 is shown and described in U.S. application Serial No. 375,226 filed August 19, 1953, now Patent No. 2,776,418.

Figure 4:
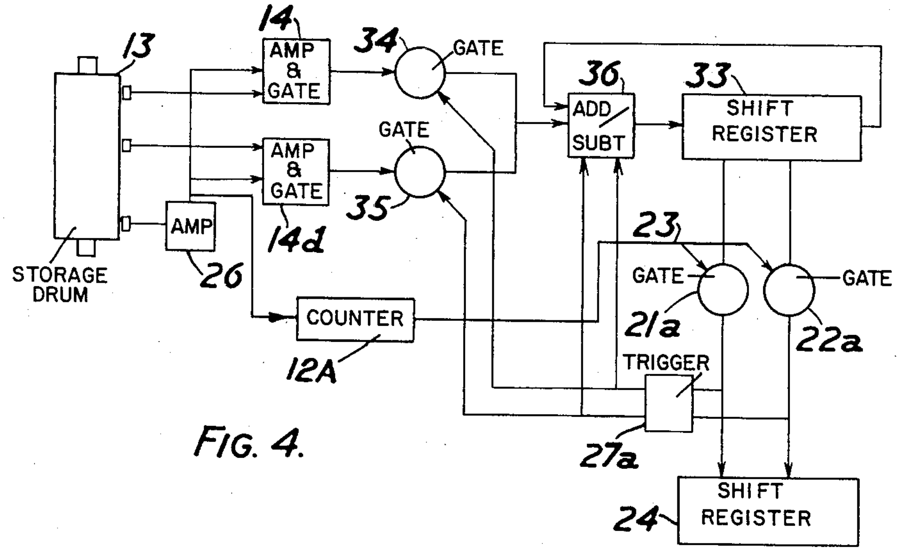
Figure 4 is a block diagram of a further modification of the form shown in Figure 2.

A further modification of the form shown in Figure 2 is shown in Figure 4. This allows over-subtraction to occur, but does not require two shifting registers to store the number and the difference. To achieve this, the difference between successive equivalents is stored on the drum, as well as the equivalents. These differences are used additively to correct any over subtraction. For example, if the equivalent of ten has been subtracted and has produced a negative result the equivalent of two (10−8) is added, so producing an overall subtraction of eight. If the result is still negative, the equivalent of four (8−4) is added to produce an overall subtraction of four and so on until the result goes positive, when subtraction of the equivalents is resumed.

The last terms of the series of equivalents and differences are as follows:

| Equivalents | Differences |
|---|---|
| 100 | 100 |
| 80 | 20 |
| 40 | 40 |
| 20 | 20 |
| 10 | 10 |
| 8 | 2 |
| 4 | 4 |
| 2 | 2 |
| 1 | 1 |

The equivalents track and the difference track are read out by magnetic heads to shaping and amplifying circuits 14 and **14*d* respectively. These are each gated by clock pulses derived from a third track via the amplifier 26** as explained in connection with Figure 2.

The equivalents output from the gating amplifier 14 is fed via a gate 34 to the add/subtract circuit 36. Likewise the difference output from the gating amplifier **14*d* is fed via a gate 35 to the circuit 36. The value in the shifting register 33 is also read into the circuit 36** and the sum or difference output is re-entered in the register.

Assuming that the gate 34 is initially open and that the add/subtract is set for subtraction, then the first equivalent will be subtracted from the original value and the result will be stored in the register 33. The most significant stage of the register 33 controls gates **21*a* and 22*a* in the same way as the register 20 (Figure 2) controls the gates 21 and 22. If the result is positive, the end of word pulse on the line 23 derived from counter 12A is passed by the gate 21*a* to enter one in the register 24 and to set a trigger 27*a* "on." With this trigger "on," the gate 34 is open and the gate 35 is closed and a control voltage is applied to the circuit 36 to condition it for subtraction. If the result is negative, the pulse from the gate 22*a* enters zero in the register and sets the trigger 27*a* to "off" which opens the gate 35, closes the gate 34 and conditions the circuit 36** for addition. Thus the equivalent is selected for subtraction or the difference is selected for addition, depending upon whether the result is positive or negative.

Figure 5:
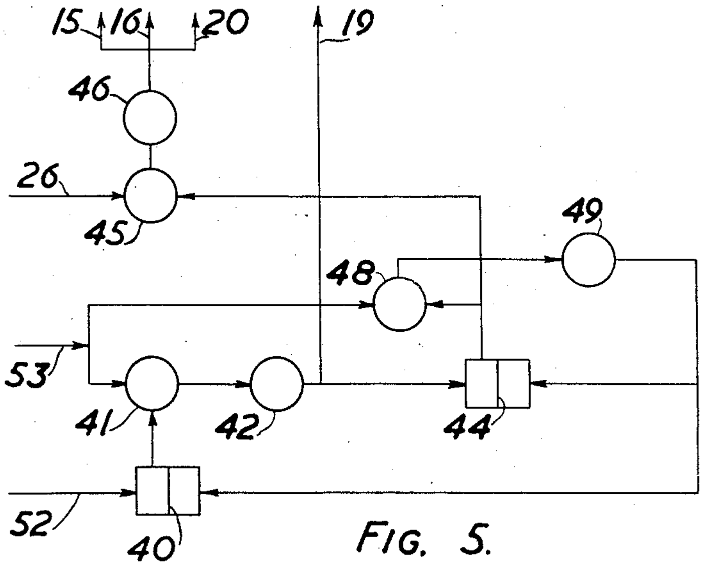
Figure 5 is a detailed block diagram of control circuit for the form shown in Figure 2.

Figure 5 is a block diagram showing a control circuit utilized in connection with Figure 2 to provide pulses for shifting values in the registers and to control the operation of the subtracting circuit and the setting of gates. It will be apparent that the control circuit is readily adapted to the modifications of Figure 2 shown in Figures 1, 3 and 4.

To start the translating operation, a pulse is applied to a line 52 which sets a trigger 40 "on." This trigger opens a gate 41 to which is applied end of revolution pulses by a line 53. The end of revolution pulse is derived from the clock track on the drum and occurs just prior to the time at which the first equivalent is read out. The next end of revolution pulse to occur after the start pulse on the line 52 will pass through the gate 41.

The output of the gate 41 drives a pulse generator 42, the output of which sets the trigger circuit 19 so that the gate 17 is opened. The same output also sets a trigger 44 "on," which opens a gate 45 to which clock pulses are fed from the circuit 26 (Figure 2). The output of the gate 45 drives a pulse generator 46 which applies high level pulses to shift the contents of the register 16 and 20 and to operate the subtracting circuit 15. The end of word pulses on the line 23 are used to shift the register 24 as this is shifted only once for each word read from the drum.

The circuit elements which have so far been described in functional terms will now be considered individually in more detail.

*Triggers*

The triggers are of known form employing a double triode with the grids and anodes D.C. cross coupled to obtain two stable conductive states. The left hand anode of the valve 100 which represents a typical trigger (Figure 7) is connected to H.T. line 158 through a resistor 166 and to the right hand grid through a resistor 169. The right hand anode is connected to the H.T. line 158 through a resistor 165 and to the left hand grid through a resistor 167. The two grids are connected to ground line 157 through resistors 170 and 168 respectively, and the cathode is connected to line 157 through a resistor 171.

The convention will be adopted that a trigger is in the "off" state when the left half of the valve is conducting and the right hand half is cut off. Accordingly, when the trigger 100 is "off" the left hand grid will be at a potential determined by the potentiometer formed by the resistors 165, 167 and 168 and the cathode will be at little above this potential. The potential of the left hand anode is approximately 50 volts and of the right hand anode 100 volts. Consequently, the right hand grid, which is connected to the left hand anode, will be below the cathode potential, maintaining the right hand half of the valve non-conducting.

The trigger is switched from one state to the other by applying a negative pulse of sufficient amplitude to the grid of the conducting half of the valve to cut it off and thus allow the other half of the valve to conduct.

*Shifting registers*

Figures 6, 7, 8:
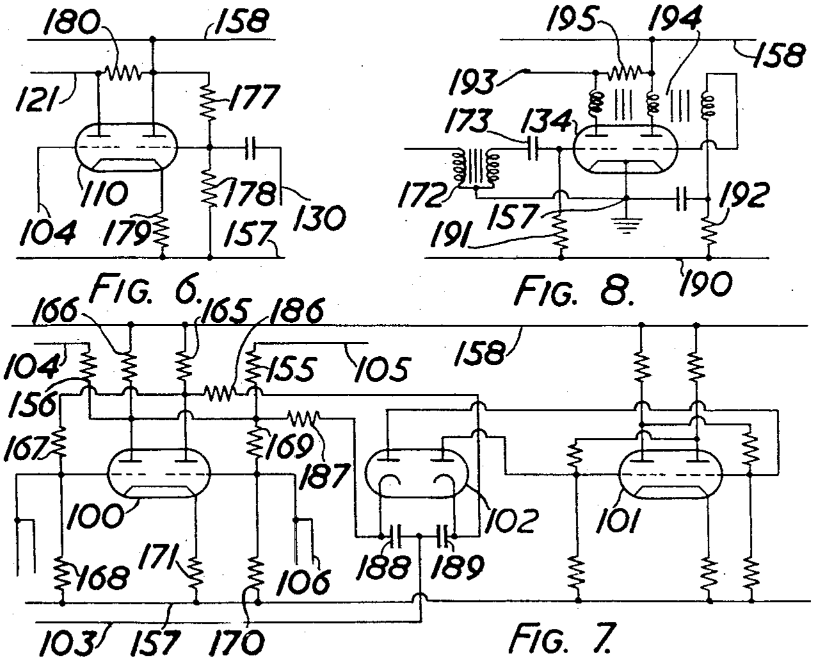
Figure 6 is a circuit diagram of a triode gate circuit.
Figure 7 is a circuit diagram of two adjacent stages of a shifting register.
Figure 8 is a circuit diagram of a pulse generator.

The shifting registers each comprise a chain of trigger stages. They differ in the number of their shifting stages registers 4 (Figure 1), 16 (Figure 2) and 33 (Figure 3) have 27 stages, and all the rest have 32 stages. Figure 7 shows two adjacent trigger stages of a register, together with the coupling diodes.

The left and right hand anodes of the first stage 100 are connected through resistors 187 and 186 to the cathodes of a pair of diodes 102, the anodes of which are connected to the right and left hand grids respectively of an adjacent trigger 101. The cathodes of the diodes are each connected to a line 103 through condensers 188 and 189 respectively.

The anode potential of the triodes may be either 50 or 100 volts and the corresponding grid potentials are approximately 33 or 22 volts. Hence, for the various combinations of states of the stages 100 and 101 the cathode to anode potential differences of the left and right hand sides of the diodes 102 will be as set out below.

| Stages | | L.H.S. of 102 | R.H.S. of 102 |
|---|---|---|---|
| 100 | 101 | | |
| On | On | 100−33=67 | 50−22=28 |
| Off | On | 50−33=17 | 100−22=78 |
| On | Off | 100−22=78 | 50−33=17 |
| Off | Off | 50−22=28 | 100−33=67 |

If, now, a negative going pulse of approximately 60 volts is applied on the line 103, only one side of 102 will conduct for any particular combination of states, the state having the smaller cathode to anode potential. When the triggers are in different states, the negative pulse is fed, through 102, to the grid of 101 which is at 33 volts so switching 101 over to the same state as 100. When the triggers are in the same state, the negative pulse is fed to the grid 102 which is at 22 volts, so that it is merely driven even further below the other grid and the trigger remains in the same state.

A similar double diode is connected between the value 101 and the next stage, and so on, the line 103 being connected in common to all the diodes, so that a single pulse on the line 103 causes the setting of the register to be shifted up one stage, the previous setting of the last stage being lost.

An indication of the stage setting is provided by the anode voltages. The left hand anode is connected to a line 104 by resistor 156 and right hand anode by resistor 155 to line 105. Line 104 therefore is at 100 volts with the stage 100 off and 50 volts with the stage 100 on and the line 105 assumes the converse voltages. Lines 104 and 105 therefore may be used to control gates to indicate the setting of the stage e.g. gates 21 and 22 (Figure 2).

*Counter*

The counter 12 comprises triggers of the type described connected in cascade in the usual way to form a six storage binary counter which provides a negative pulse from the last stage for every thirty-two pulses applied to the input.

*Gates*

These gates are opened or closed by a D.C. voltage so as to transmit or prevent the emission of a pulse in response to an input pulse. The diodes 102 are an example of a diode gate in that a negative pulse on line 103 is transmitted by each diode in accordance with the D.C. voltages applied to the anodes and cathodes. This form is used, for example, for the gates 21 and 22 (Figure 2).

An alternative form of gate is shown in Figure 6, which provides for isolating the D.C. and pulse inputs.

The right hand grid of a double triode 110 is connected to the junction of two resistors 177 and 178 which form a potentiometer between the H.T. line 158 and the line 157. This normally maintains the grid at approximately 110 volts. The right hand anode is connected to the line 158, and the common cathode is connected through a resistor 179 to the line 157. Consequently, the cathode is held at a little more than 110 volts positive.

The left hand grid is connected to the line 104 from one anode of a trigger stage, for example, and consequently is at either 50 or 100 volts. If a negative pulse of say 30 volts amplitude is applied to line 130 and so to the right hand grid the cathode will tend to drop to 80 volts. If the left hand grid is at 100, this will conduct and the cathode will be held at approximately this value. The voltage on the left hand anode will drop due to the current drawn through resistor 180 to provide a negative going output pulse on line 121. If the left hand grid is at 50 volts, the cathode falls to 80 volts, the left hand half remains non-conducting and there is no output pulse.

*Pulse generator*

The pulse generator (Figure 8) comprises a blocking oscillator of known form operated by positve triggering pulses. The negative pulses provided by the gates described are inverted by a pulse transformer 172 and the positive pulses applied to a condenser 173 connected to the left hand grid of a double triode 134. The grid is normally held cut off by a connection through a resistor 191 to a negative bias line 190. The pulse of anode current produced by the input pulse passes through one winding of a transformer 194.

The second grid of the valve 134 is connected through the second winding of a transformer 194 and a resistor 192 to the bias line 190. The corresponding anode is connected through a third winding of the transformer 194 and a resistor 195 to the H.T. line 158.

The pulse of an anode current in the first winding induces a voltage in the second winding so that the grid connected to it is brought above cut-off. The second valve of the triode then acts as a blocking oscillator by regeneration between the second and third windings to produce a large output pulse. The time constants of the circuits are so chosen that the output on line 193 connected to the junction of the resistor 195 and the third winding of the transformer is a single negative going pulse.

*Delay circuit*

The delay circuit 30 (Figure 3) has to provide a fixed delay of one word duration. A one word shifting register, having shifting pulses in common with the register 33 may be used. However, it is more economical to use a lumped constant delay line having the required characteristics, or alternatively, an ultra-sonic mercury delay line.

What I claim is:

1. Apparatus for translating a number from a first radix to a second radix of notation, said apparatus comprising a first store for registering signals representing a number in the first radix; a cyclically operable, serial-mode second store for storing a plurality of groups of signals representing in said first radix the equivalents of predetermined values in said second radix, said predetermined values being such that any desired number in the second radix may be expressed as combinations of such values; a subtracting circuit having a first and a second input and one output responsive to serial-mode signals respecting members in the first radix applied to the inputs thereof to form difference representing signals at the output thereof; means to apply signals read during successive cycles from said second store to the first input of said subtracting circuit; a third store to register successive difference signals during successive cycles of operation; control means to apply signals read-out from said third store to the second input of said subtracting circuit and to said first store when said third store contains a positive number, and to apply signals read-out from said first store to the second input of said subtracting circuit and to said first store when said third store contains a negative number; and a fourth store to store a record of the sequence of operation of said control means.

2. Apparatus for translating a number from a first radix to a second radix of notation, said apparatus comprising a first shifting register for storing signals representing a number in the first radix; a timing pulse generator; a store cyclically operable under the control of the output of said generator for storing a serial-mode a plurality of groups of signals representing in said first radix the equivalents of predetermined values in said second radix, said predetermined values being such that any desired number in the second radix may be expressed as combinations of such values; a subtracting circuit having a first and a second input and one output responsive to serial-mode signals representing numbers in the first radix applied to the inputs thereof to form difference representing signals at the output thereof; means to apply signals read during successive cycles from said second store to the first input of said subtracting circuit; a second shifting register to store successive difference signals during successive cycles of operation: a first gate operable to feed output signals from said second register to the second input of said subtracting circuit and to said first register; a second gate operable to feed output signals from said first register to the second input of said subtracting circuit and to said first register; control means responsive to output signals from said timing pulse generator and to the setting of said second register to render operative said first gate if said second register stores a positive number, and the second gate if said second register stores a negative number; and a third shifting register with an input responsive to the operation of said control means.

3. Apparatus for translating a binary number to its decimal equivalent, said apparatus comprising a magnetic storage drum, an equivalents track on said drum having recorded therein a plurality of groups of equivalent signals in serial-mode, each such group representing a decimal value expressed in binary and the decimal values being such that any desired decimal number may be expressed as combinations of such value, and a timing signal track on said drum; magnetic reading heads co-operating with said tracks; a binary subtracting circuit having a first and a second input and output responsive to serial-mode binary digit representing signals applied to the two inputs thereof to form difference digit representing signals at the output, means to apply signals read from the equivalents track by the associated head to the first input of the subtracting circuit; a first shifting register with an input responsive to said difference signals; a second shifting register for storing binary numbers and which stores initially the binary number to be translated; a first gate operable to feed output signals from said first register to the second input of the subtracting circuit and to said second shifting register; a second gate operable to feed output signals from said second register to said second input of the subtracting circuit and to said second register; a counter responsive to timing signals read from the timing track by the associated head to generate a control signal after each group of equivalent signals has been read; control means responsive to said control signal and to the setting of said first register to render operative the first gate, if said first register stores a positive number, and the second gate, if said first register stores a negative number, for the duration of the reading-out of the next group of equivalent signals; and a third shifting register with an input responsive to the operation of said control means.

References Cited in the file of this patent

UNITED STATES PATENTS

| | | |
|---|---|---|
| 2,444,042 | Hartley et al. | June 29, 1948 |
| 2,617,704 | Mallina | Nov. 11, 1952 |
| 2,652,501 | Wilson | Sept. 15, 1953 |
| 2,810,518 | Dillon et al. | Oct. 22, 1957 |
| 2,830,758 | Gloess | Apr. 15, 1958 |
| 2,831,179 | Wright | Apr. 15, 1958 |

FOREIGN PATENTS

| | | |
|---|---|---|
| 1,022,202 | France | Dec. 10, 1952 |

OTHER REFERENCES

"Theory and Techniques for Design of Electronic Digital Computers," Lecture 25, "Conversion Between Binary and Decimal Number Systems," Univ. of Penn., June 30, 1948. Pages 25–1 to 25–8, total eight pgs.

"24 Digit Parallel Computer With Magnetic Drum Memory" by Engineering Research Associates, Inc., 1949. (Fig. 3.2–2, 3.3–4, 3.3–5, pages 24 through 28, and title page; total nine pages.